April 8, 1930.  F. J. GIVEN  1,753,337

ADJUSTABLE INDUCTANCE COIL

Filed July 11, 1928

INVENTOR
FREDERICK J. GIVEN
BY
*J.O.Burgess*
ATTORNEY

Patented Apr. 8, 1930

1,753,337

UNITED STATES PATENT OFFICE

FREDERICK J. GIVEN, OF EAST ORANGE, NEW JERSEY, ASSIGNOR TO BELL TELEPHONE LABORATORIES, INCORPORATED, OF NEW YORK, N. Y., A CORPORATION OF NEW YORK

ADJUSTABLE INDUCTANCE COIL

Application filed July 11, 1928. Serial No. 291,745.

This invention relates to inductance coils and particularly to those of the adjustable type.

An object of the invention is to adust accurately the value of the inductance of a coil without appreciably increasing its resistance.

Another object of the invention is to adjust the inductances of the windings of a balanced filter coil by equal amounts with minimum change of resistance of the coil.

Among the features of the invention is a short-circuited laminated copper ring or loop which is coupled with the main coil and which is movable with respect thereto to adjust its inductance and in the case of the balanced coil, without disturbing the balance.

Other features of the invention reside in the means for mounting the auxiliary coil in order that it may readily be moved with respect to the main coil, adaptations of the mounting to potted filter coils and also methods of laminating the adjustable ring or loop.

As an example in the signaling art where coils of the type described herein may be used, filters may be mentioned, particularly of the band pass type where the accuracy of the frequency placement is largely dependent upon building filter elements which have a precise value of inductance.

In the determination of the specific values of inductance and capacity for filter elements it is necessary to consider the effect of the elements upon each other due to their relative positions in the filter, the effect of shielding, the effect of inter-element cabling, etc. When these many effects are taken into consideration it is possible to specify values of inductance and capacity which will enable the filter cut-off points to be sharply defined. However, when fixed inductances and capacities are used some difficulties arise in attempting to obtain accuracy in the filter cut-off points, as for instance the practical manufacturing consideration which necessitates a certain tolerance above and below the nominal inductance value of the coil.

These manufacturing inaccuracies in the filter elements are partly compensated for by adjusting the elements in pairs, i. e., the inductance coil is tested with the capacity with which it is to be used in the filter. The advantages of this method as compared with the adjusting of the individual elements resides partly in the elimination of certain bridge errors, partly in the fact that the condensers used can be built with greater accuracy than the individual coils and finally that in the adjustment of a coil to resonance with a particular condenser there may be a tendency to offset the error of the condenser by an opposing error in the inductance coil.

It may be readily appreciated that an inductance coil which may be varied within a small range above and below its mean inductance value is of considerable advantage in such a method of testing as both inaccuracies in the capacity elements as well as in the inductance elements may be compensated for.

It is essential in an adjustable filter coil that the inductance be capable of adjustment without affecting the resistance of the coil to any appreciable extent. The following relations have been found to exist in a coil which is magnetically coupled with a short-circuited ring or loop. These are approximations which hold quite closely where $2\pi FL_2$ is large as compared with $R_2$ $$(1) \quad R_{12} = R_1 + K^2 \frac{L_1}{L_2} R_2$$

$$(2) \quad L_{12} = L_1(1-K^2)$$

where $R_1$ = resistance of coil alone at frequency F.
$R_2$ = resistance of ring alone at frequency F.
$L_1$ = inductance of coil alone.
$L_2$ = inductance of ring alone.
$K$ = coefficient of coupling between coil and ring.
$R_{12}$ = resistance of coil as modified by ring.
$L_{12}$ = inductance of coil as modified by ring.

Having determined the amount of adjustbent for which provision must be made and also the tolerable values of $R_{12}$, the proper relations and values of resistance, inductance and coupling may be obtained from the relations given by Equations 1 and 2.

A further understanding of the invention and of ways in which it may be carried out may be had by reading the following description together with the accompanying drawings in which Fig. 1 shows a short-circuited laminated coil arranged to adjust the inductance of the coil and Fig. 2 an adaptation of the invention to an encased filter coil.

Fig. 4 illustrates a section through the coil at 4—4 (Fig. 3), showing details of the wedge and slot, while

Figure 1:
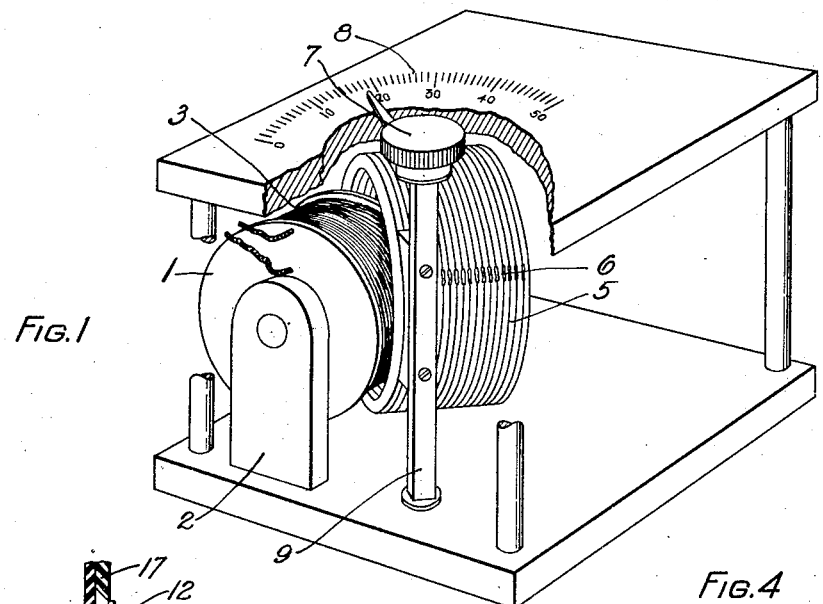

Referring to Fig. 1 a coil spool 1 is shown mounted upon a suitable standard 2. The spool is shown wound with an inductance coil comprising the winding 3. Rotatably mounted with respect to the spool 1 is a short-circuited copper coil 5. The coil 5 is laminated to secure the desired relation between the ratio of inductance to resistance of winding 3 and the ratio of inductance to resistance of the coil 5. These values may be determine from the relations given above.

In this particular embodiment each lamination is shown in effect short-circuited by the soldering across from turn to turn as shown at 6 although the same effect is obtained by simply short-circuiting the ends of the coil. A knob 7 and a shaft 9 rotatably attached to the coil 5 are provided in order that the coil may be rotated with respect to the winding 3 to adjust its inductance. The amount of change of inductance may be determined by calibrating the dial 8.

If a balanced winding were substituted for the single winding shown, both windings could be simultaneously adjusted if the loop were symmetrically pivoted with respect to the windings.

Figure 5:
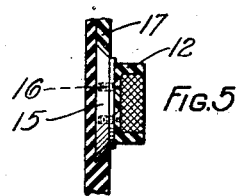
Fig. 5 is a section through the auxiliary coil at 5—5 (Fig. 3) showing details of the auxiliary coil and bearing means.
Figure 2:
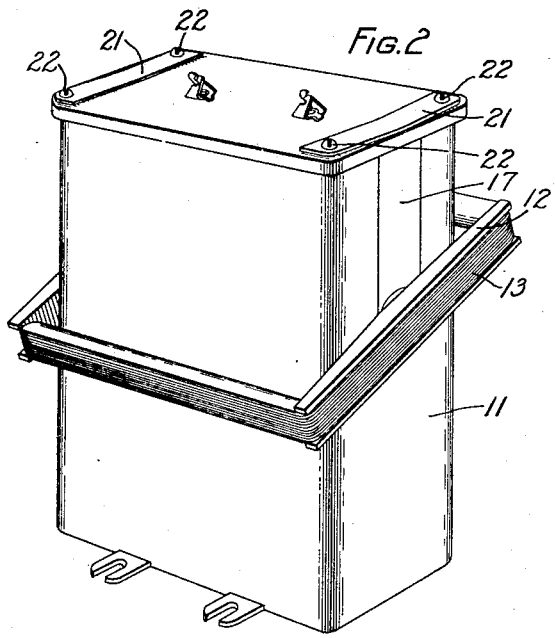
Figure 4:
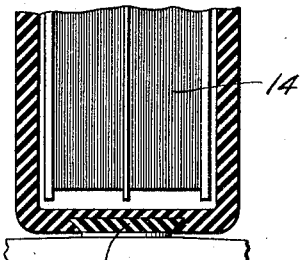
Figure 3:
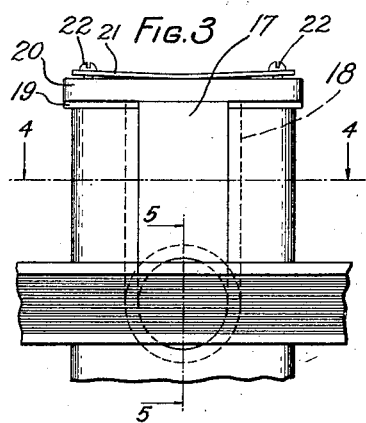
Fig. 3 shows in detail the means for pivoting and clamping the movable coil externally of the non-metallic casing.

Fig. 2 shows the invention applied to an encased filter coil. A balanced solenoidal coil 14 shown in Fig. 4 similar to that described in connection with Fig. 1 is housed in a casing 11 which may be of any suitable material such as phenol fibre. The coil is impregnated with some water-proofing material to prevent the access of moisture to the windings. Pivoted upon the outside of the casing is a yoke or loop 12 for supporting the short-circuited laminated coil 13. In order to obtain a coil of sufficiently low resistance for the purposes of the invention very fine wire is used which is wound upon the loop frame 12 with the ends soldered together although any method of providing a laminated loop such as using stranded wire may be used. The loop 12 is pivoted and held in position by means of the hub member 15 and the wedge member 17. The hub and wedge members are made preferably of the same material as that which composes the casing since it is desirable that as little metal as possible be used outside of the coil itself. As shown in Figs. 4 and 5 the hub member has a beveled edge and is adapted to be mounted in a slot 18 of similar shape extending from the top of the casing down to a point which permits the axis upon which the loop rotates to intersect the axis of the solenoidal coil. The inner edges of the slot 18 are shown dotted in Fig. 3 and may be either milled or molded in the casing. The wedge member 17 has its sides formed to fit the slot 18 in which it slides and its bottom end shaped to fit the hub member 15. The wedge extends a small distance above the top of the casing wall leaving a small amount of clearance 19 between the case and the case covering 20. This permits the cover to rest directly upon the top of the wedge so that pressure is applied at this point when the cover is screwed in position by the screws 22. Since phenol fibrous materials have the property of assuming a permanent set or being otherwise affected by atmospheric conditions a spring member 21 is used to provide a follow-up pressure on the wedge. The wedging action on the hub member 15 tends to force its inner surface tightly up against the casing wall so that the large frictional contact thereby provided effectively prevents the loop 12 from being displaced once the adjustment has been made.

In order to adjust the loop it is only necessary to loosen the screws 22, adjust the loop to its desired position and tighten up on the screws again. The entire arc through which the loop 12 may be rotated provides an adjustment of approximately 2 to 3% above and below the nominal value of the coil although any percentage range desired may be obtained determined only by the physical characteristics of the loop. Regardless of the inductance of the main coil the percentage variation permitted by the same short-circuited loop is the same. The short-circuited laminated coil provides a simple method of adjusting the inductance of a fixed coil while the particular type of bearing used for mounting the coil exterior of the casing takes up very little room and is exceedingly simple of adjustment.

Although the invention has been described in connection with specific embodiments thereof it is capable of many other forms, within the spirit of the invention and is to be limited only by the scope of the appended claims.

What is claimed is:

1. A variable balanced inductance coil having a plurality of winding sections, and a short-circuited coil of wire mounted for angular movement with respect to said coil in the field of said coil and symmetrically with respect to said winding sections, to vary the inductance of said winding sections simultaneously in the same proportion.

2. As an article of manufacture, a nominally fixed inductance with provision for making a calibrating adjustment to correct for manufacturing irregularities, a main inductance coil, a casing in which said coil is adapted to be mounted, a closure member for said casing, a correcting coil external to said casing and mounted on the casing for angular movement relative thereto, and means actuated by said closure member for holding said correcting coil in fixed angular position.

3. The combination with an encased solenoidal coil of means external of the casing for varying the inductance of said coil within a range of plus or minus a small percentage of its mean inductance value, said means comprising a laminated copper ring positioned upon a supporting frame and pivoted on said casing, said pivoting means comprising a frustrum shaped hub member having a comparatively large bearing surface resting in a slot in said casing suitable to receive said member and a wedged member slidable in said slot for tightly clamping said ring supporting frame in its adjusted position.

4. The combination with an encased solenoidal coil of means external of the casing for varying the inductance of said coil within a small percentage range from its nominal inductance value, said means comprising a laminated copper ring positioned on a supporting frame and pivoted on said casing, said pivoting means comprising a frustrum shaped member having a comparatively large bearing surface resting in the slot in said casing suitable to receive said member, a wedged member slidable in said slot, and means comprising the case cover for tightly forcing said wedge against the hub member to clamp said ring supporting frame in its adjusted position.

In witness whereof, I hereunto subscribe my name this 9th day of July, 1928.

FREDERICK J. GIVEN.